UNITED STATES PATENT OFFICE.

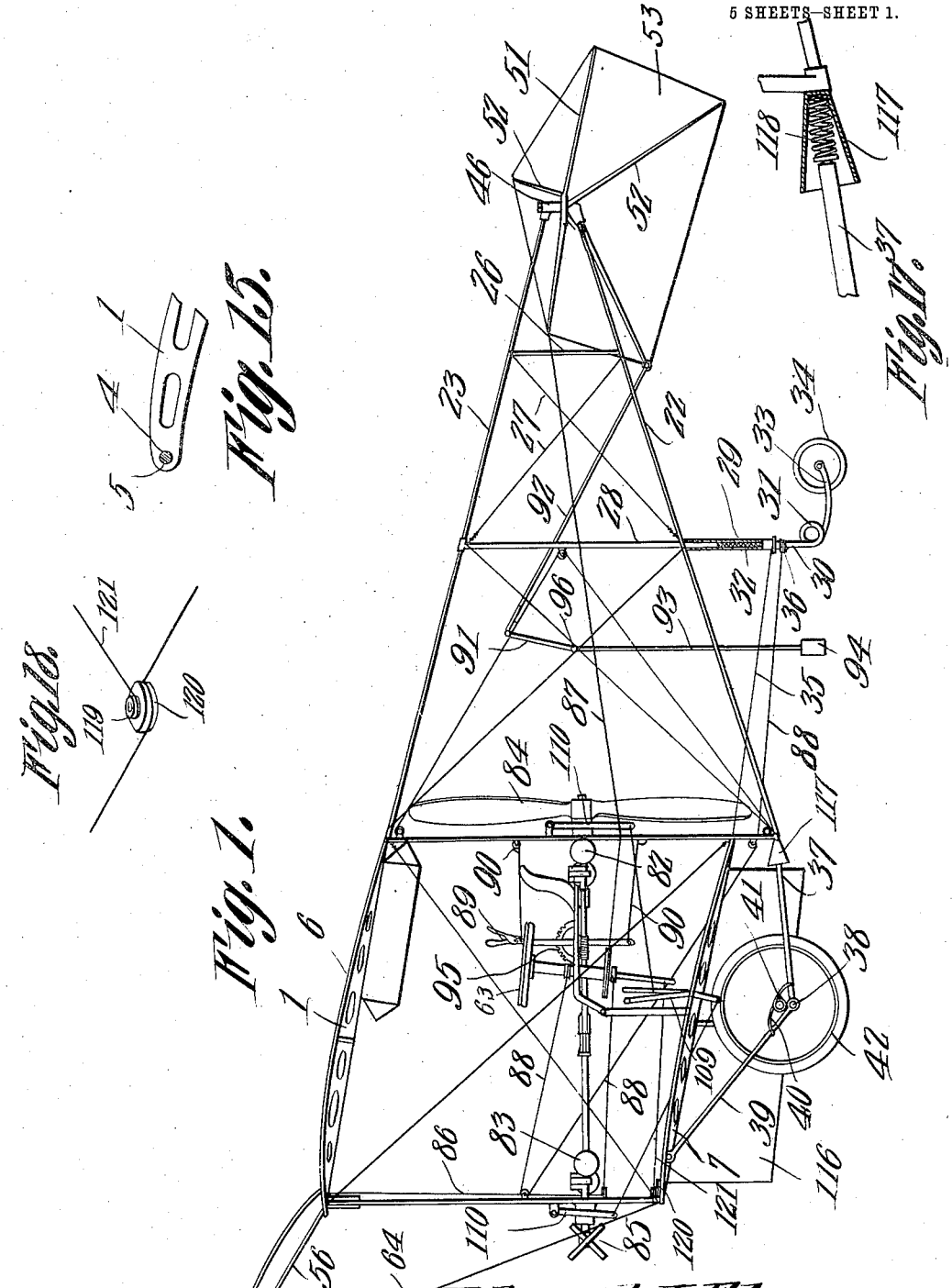

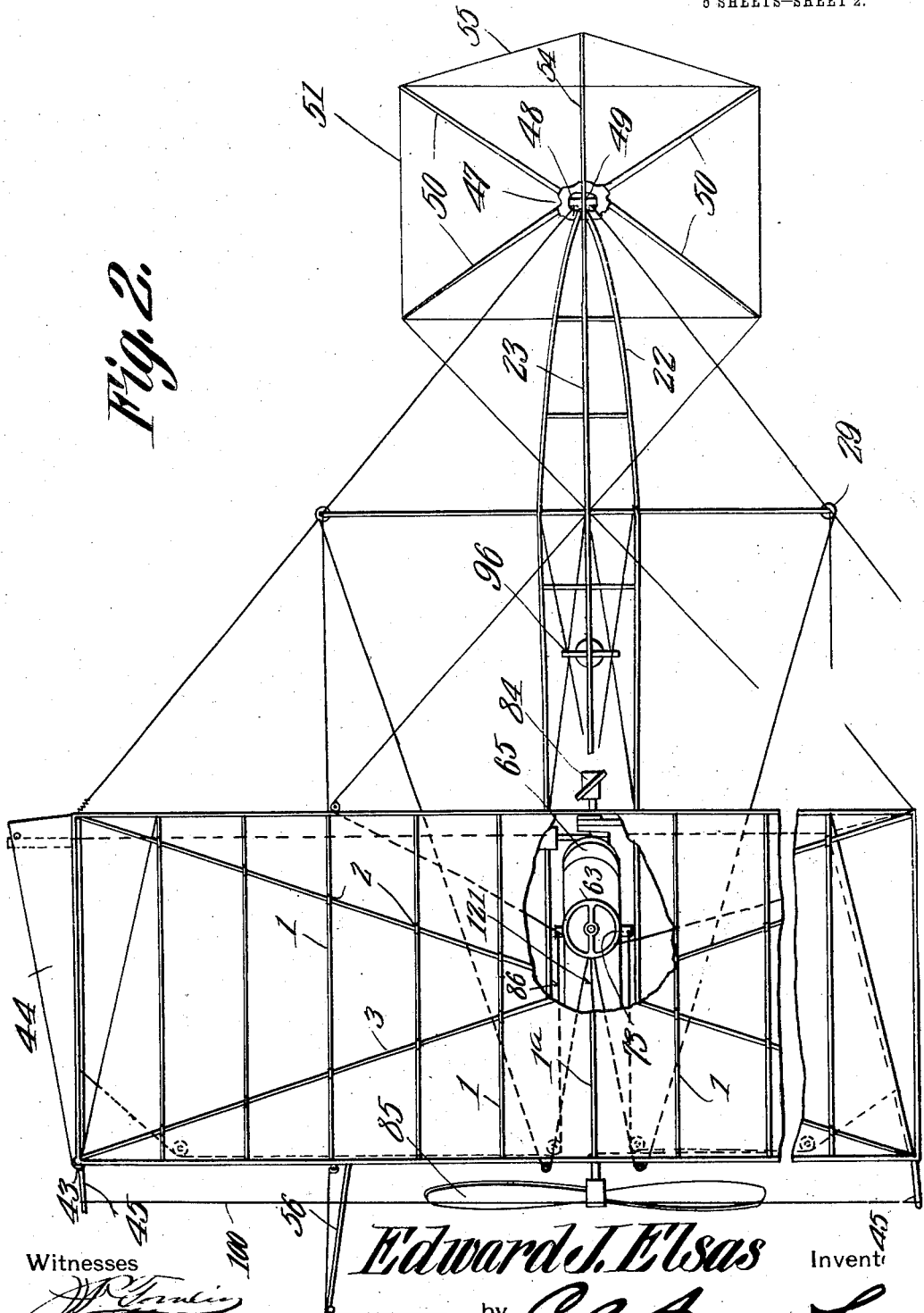

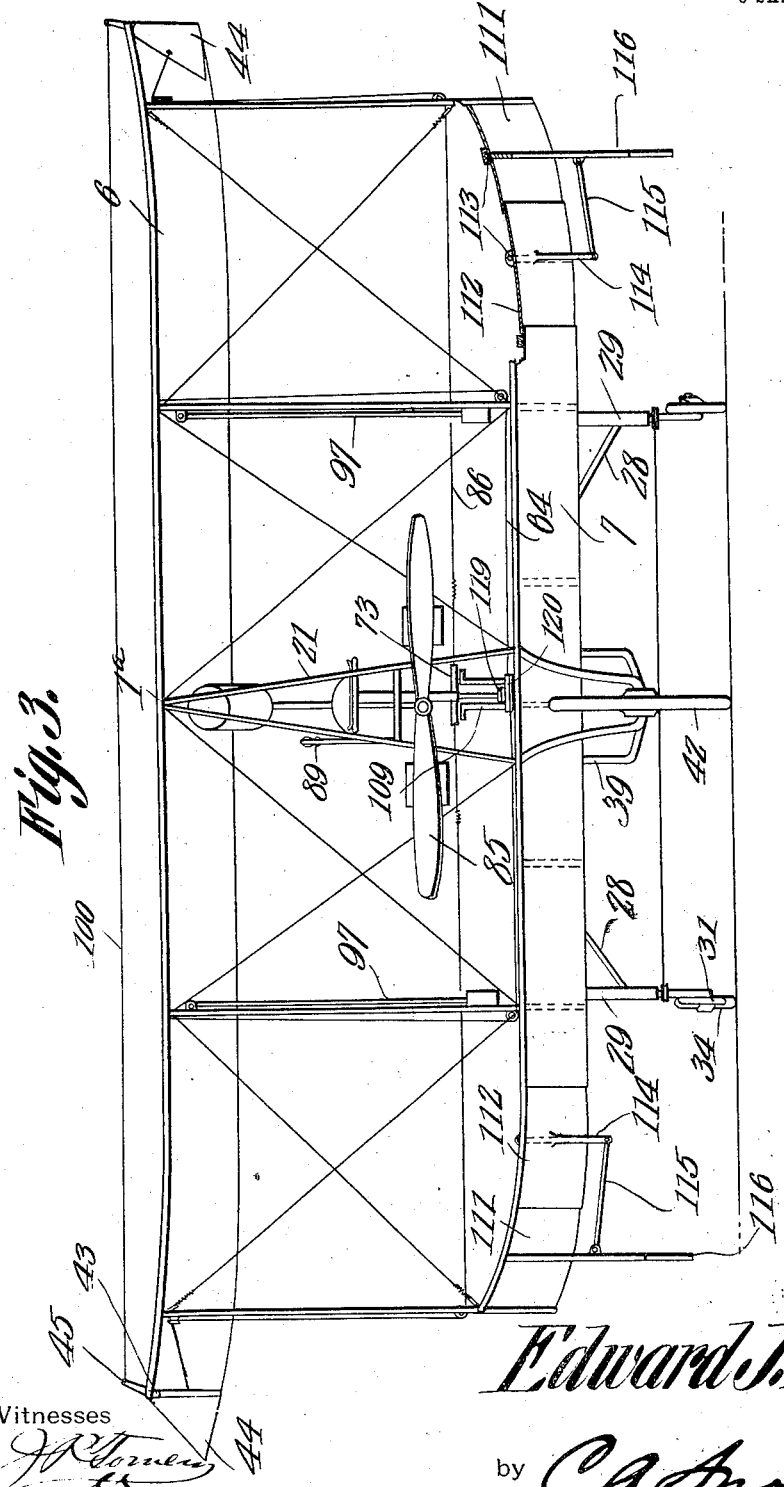

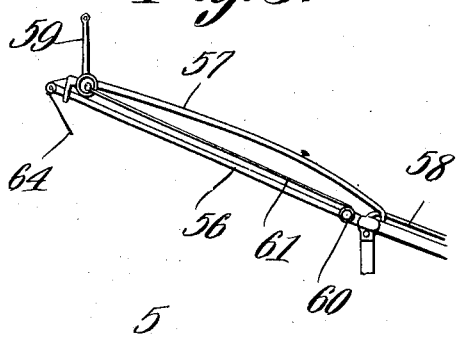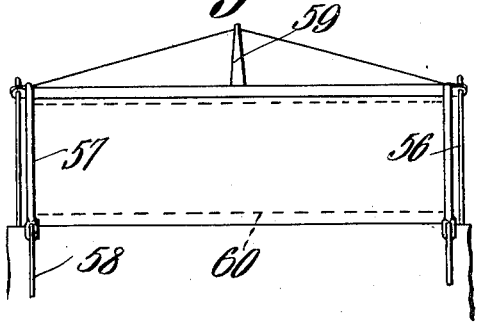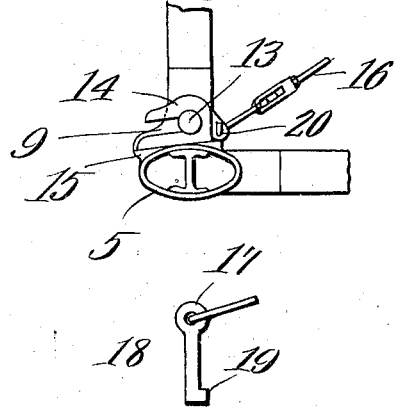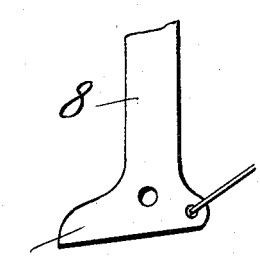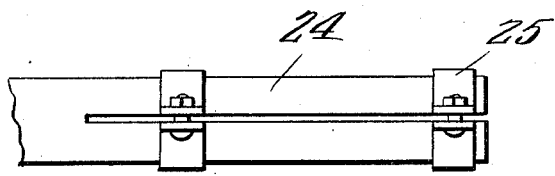

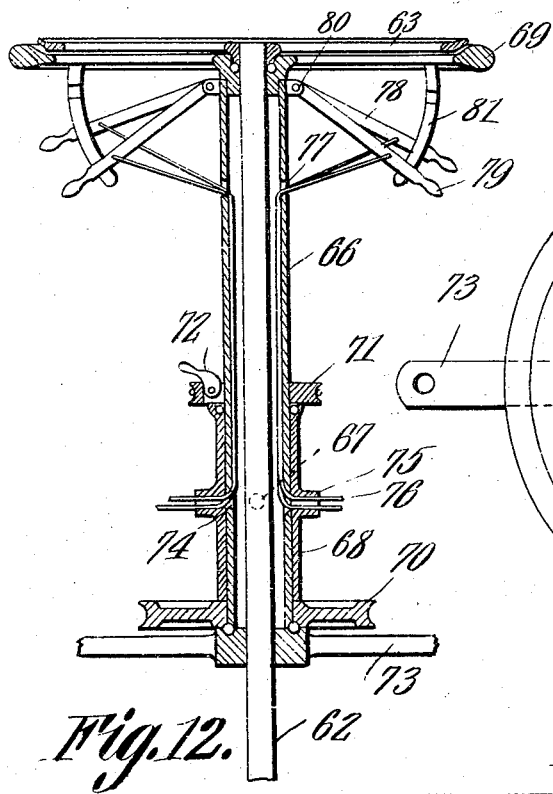
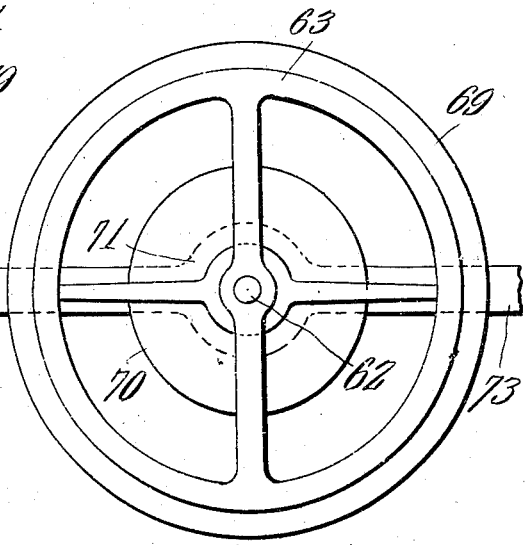
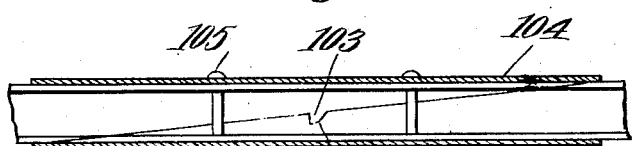
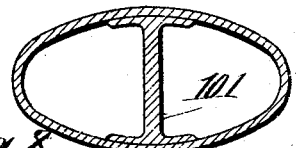
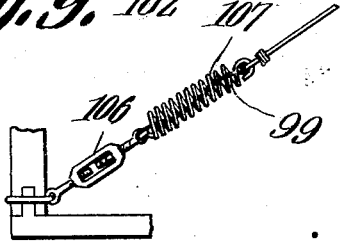
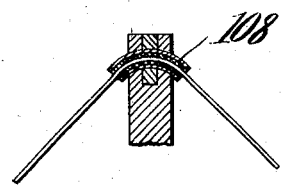

EDWARD J. ELSAS, OF KANSAS CITY, MISSOURI.

AEROPLANE.

1,041,759.  Specification of Letters Patent.  Patented Oct. 22, 1912.

Application filed July 28, 1911. Serial No. 641,100.

*To all whom it may concern:*

Be it known that I, EDWARD J. ELSAS, a citizen of the United States, residing at Kansas City, in the county of Jackson and State of Missouri, have invented a new and useful Aeroplane, of which the following is a specification.

This invention relates to aeroplanes of the biplane type such as disclosed in Patent No. 992,410 issued to me on May 16, 1911, one of the objects of the invention being to provide means whereby either or both the lateral and the longitudinal balance of the machine can be maintained or restored automatically, additional means being provided for restoring the balance manually or for tilting the machine either laterally or longitudinally for controlling the direction of flight.

A further object is to provide compact controlling mechanism which can be readily operated by the aviator and whereby the balancing planes or ailerons, together with the rudders, may be shifted easily, the motor controlling means being assembled close to the means provided for operating the ailerons and the rudders.

A further object is to provide a machine of this character which can be readily collapsed when not in use and quickly set up, the structure being such as to permit the frame and the operating parts to yield slightly when subjected to sudden strains so that the parts will not be injured when jerked suddenly and the machine will therefore be rendered more reliable and capable of withstanding strains.

With the foregoing and other objects in view which will appear as the description proceeds the invention resides in the combination and arrangement of parts and in the details of construction hereinafter described and claimed, it being understood that changes in the precise embodiment of the invention herein disclosed can be made without departing from the spirit of the invention.

In the accompanying drawings the preferred form of the invention has been shown.

In said drawings:—Figure 1 is a side elevation of the machine. Fig. 2 is a plan view thereof, a portion of one of the sustaining planes being removed and certain of the parts being broken away for the sake of clearness. Fig. 3 is a front elevation. Fig. 4 is a detail view of the emergency plane and its carrying structure. Fig. 5 is a side elevation of the parts shown in Fig. 4. Fig. 6 is an elevation of one of the posts or uprights of the structure and showing its connections with the spars or ribs. Fig. 7 is a detail view of a locking pin to be used in connection with the structure shown in Fig. 6, said pin being shown on an enlarged scale. Fig. 8 is an enlarged transverse section through one of the posts or uprights. Fig. 9 is a view partly in section and partly in elevation showing one form of splice which may be used in the construction of the machine. Fig. 10 is an enlarged view showing a yielding connection between a brace or guy wire and a portion of the frame. Fig. 11 is a detail view showing another form of connection between the guy wires or braces and a portion of the frame structure. Fig. 12 is a view partly in section and partly in elevation of the control. Fig. 13 is a plan view of the parts shown in Fig. 12. Fig. 14 is a detail view of one of the joints whereby the rudder carrying portion of the structure may be detachably connected to the frames of the sustaining planes. Fig. 15 is an elevation of the front portion of one of the ribs of the upper sustaining plane and showing the front cross member in section. Fig. 16 is an elevation of one end of one standard. Fig. 17 is a longitudinal section through one end portion of the wheel supported frame. Fig. 18 is a detail view of a double pulley to be used in connection with the emergency plane.

Referring to the figures by characters of reference 1 designates ribs, preferably of light metal having open portions for further reducing the weight thereof and the upper faces of these ribs are curved. Eyes 2 are formed in the ribs and receive diagonal braces 3, and additional eyes 4 are formed in the front ends of the ribs and receive the front members 5 of the frame of the top sustaining plane 6. Said plane which is formed either of light metal or of a fabric stretched upon the ribs and braces and curved downwardly from its front to its rear edge and also upwardly at its ends, as clearly indicated in Figs. 1 and 3 respectively. It is to be understood that the ribs 1 may be connected together at their rear ends in any manner desired.

The lower sustaining plane 7 is shorter than the upper plane 6 and its ends are more abruptly curved than are the ends of the upper plane. The frame of this lower plane is of the same construction as the frame of the upper plane. But instead of the lower plane extending continuously over the frame, the end portions thereof are made up of normally lapping supplemental planes 111 and 112, each of these planes being pivotally supported, at its center, upon a rod 113 parallel with the end of the frame of the lower plane. Each rod 113 has an arm 114 extending downwardly therefrom and fixed relative thereto, the arms at each side of the machine being connected by a rod 115 pivoted to the arms. A controlling plane 116 extends downwardly from each of the planes 111 and extends longitudinally of the rods 113 of said planes. By utilizing the supplemental planes 111 and 112 and the controlling planes 116 it will be seen that when the machine is suddenly struck by a side gust of wind, the air current, instead of working under the upturned sides of the lower sustaining plane and tilting the machine will press against the plane 116 at the windward side of the machine and cause it to swing inwardly toward the center of plane 7. This movement of plane 116 will cause the two supplemental planes 111 and 112 to tilt upon their rods 113 and thus overcome the tendency of the wind to tilt the machine. Under normal conditions the air pressure upon the lower faces of the planes 111 and 112 serves to maintain the planes in lapped relation and in the positions indicated in Fig. 3. The two planes 6 and 7 are detachably connected by a plurality of posts or standards connected to the front and rear cross members 5 as illustrated in detail in Fig. 6. Each of these standards is preferably made of two telescopically connected members 8. A foot 9 is formed at each end of the standards, the two feet being extended in substantially the same direction. The upper end of each standard is pivotally connected, as at 10, to ears 11 extending from a casting or the like secured to one of the members 5, said casting having a stop shoulder 12 constituting an abutment for the foot so as to prevent the standards from swinging in one direction relative to the upper member 5 after said standard has been brought to a predetermined angle relative to the upper sustaining plane. The lower foot of the standard 8 is pivotally connected, as at 13, to slotted ears 14 extended upwardly from a casting 15 on the lower member 5 of the machine. Casting 15 constitutes an abutment for the lower foot 9 and thus serves to limit the swinging movement of the standard 8 relative to the lower sustaining plane. The pivot devices 13 are slidably mounted within the slots in the ears 14 but can only be removed therefrom by pushing the foot 9 outwardly relative to the lower sustaining plane. As free movement of the standard 8 in this direction is prevented by the coöperation of the upper foot 9 with the stop projection 12, it will be apparent that the standard can only be disengaged from the lower ears 14 by springing it therefrom. The standards or posts 8 at the front of the machine must be sprung forwardly at their lower ends in order to become disengaged from the frame of the lower sustaining plane, and the posts or standards at the rear of the machine must be sprung rearwardly at their lower ends in order to become disengaged from the frame of the lower sustaining plane. When once disengaged from the lower sustaining plane, however, these standards can be swung with their brace wires upwardly and inwardly against the upper sustaining plane, and without loosening them, thus forming a very compact folded structure.

In order to hold the posts or standards against movement relative to the frames of the planes, brace wires or rods 16 are connected to the castings to which the upper ends of the posts or standards 8 are connected and these wires or rods extend downwardly and are crossed, each rod having a turn buckle whereby it can be readily tightened. Those rods extending downwardly and forwardly are connected to eyes 17 formed on locking pins 18, each pin having a radially extending stud 19 insertible through a slot 20 in one of the lower feet 9, said pin being rotated after such insertion so as to bring the stud or projection 19 to a position where it will prevent the pin from being withdrawn from the foot 9 and the pull of the rods 16 on the pins serving to prevent the rotation of the pins and their withdrawal after the rods have once been tightened. It will be apparent that as long as the rods 16 are taut it will be impossible for the frames of the upper and lower sustaining planes to shift or swing relative to the posts or standards 8 and therefore a very rigid structure is produced. When, however, it is desired to collapse the structure, the rods 16 extending downwardly and forwardly can be loosened, thus permitting the rotation of pins 18 and their withdrawal from engagement with the lower front feet 9. The lower ends of the front standards or posts 8 can then be sprung forwardly out of engagement with the ears 14 after which the rear posts or standards 8 can be disengaged from the rear portion of the frame of the lower sustaining plane.

The middle rib 1ᵃ of the upper sustaining plane is connected to the two middle ribs of the lower sustaining plane by means of downwardly diverging frame members 21 extending below the rear edge of the plane 7. The lower ends of these frame members are secured to rearwardly converging spars 22 which are inclined upwardly and are connected, at their rear ends, to a similar spar 23 inclined upwardly to the rear end of the central rib 1ª of the upper sustaining plane. These spars 22 and 23 may be detachably secured to the members 21 and to the rib 1ª in any suitable manner. It is preferably done by providing split tubular extensions 24 upon the lower end portions of the members 21 and upon the rear end of the rib 1ª, these extensions receiving the spars 22 and 23 and having clamps 25 extended around them whereby the sleeves can be tightened on the spars and thus securely fasten them to the members 21 and to the rib 1ª, respectively. By loosening the clamp 25 however, the spars 22 and 23 can be readily disconnected when it is desired to collapse the machine or to replace any one of the spars.

The spars 22 and 23 form a rearwardly extending frame which may be braced at desired points by means of connecting strips 26 and crossed wires 27 or the like. Downwardly diverging standards 28 are connected to the spars adjacent the centers thereof and are suitably braced, each of these standards being provided, adjacent its lower end, with a tubular upright 29 in which is slidably mounted the stem 30 of a skid 31 made of suitable spring material. The stem bears upwardly against a spring 32 within the upright and the skid 31 has a forked end 33 in which is journaled a wheel 34. A brace wire 35 may connect the lower end of each upright to one of the frame members 21 so as to render the structure sufficiently rigid. A pulley 36 is preferably secured to the stem 30 and is for the purpose hereinafter set forth.

Bars 37 are hingedly connected to the lower ends of the members 21 and are in turn pivotally connected, as at 38, to bars 39 attached to the middle ribs of the lower plane 7. Bearing springs may be connected to the bars 37 and 39 as indicated at 40, these springs being engaged by the trunnion or axle 41 of a wheel 42. The rear ends of bars 37 may be slidably mounted within conical sockets 117 containing compression springs 118 against which the rods abut. The said rods are thus permitted to move rearwardly within the sockets 117 and, at the same time, to swing upwardly and downwardly. Other means than that described may be employed for connecting wheel 42 to the structure. The wheels 34 are 42 are adapted to hold the machine in proper position while the same is resting on the ground prior or subsequent to its flight.

As shown in Fig. 3 the two planes 6 and 7 are inclined upwardly and forwardly with relation to the surface on which the machine is supported. Journaled within the front cross member 5 of the upper sustaining plane 6 and near the ends of said member, are upstanding shafts 43 each of which extends upwardly to the forward end of a substantially triangular aileron 44 to which it is fixedly connected. These ailerons are so positioned and proportioned as to normally lie under the end portions of the upper sustaining plane 6 but to shift laterally beyond either of said ends when the machine is tilted laterally and it is desired to restore the lateral balance. The means provided for this purpose will be hereinafter set forth. Each of the shafts has an arm 45 projecting forwardly therefrom.

A universal joint 46 is arranged at the meeting ends of the spars 22 and 23, this joint constituting the connection between the spars and the combined horizontal and vertical rudder used in connection with the machine. This universal joint includes a ring 47 mounted for swinging movement upon trunnions 48 extending laterally from a stem 49, said stem being journaled within a cap or the like connecting the spars 22 and 23. Ribs 50 radiate from the ring 47 and carry the horizontal rudder fabric 51. The ribs 52 of the vertical rudder extend from the middle portion of the horizontal rudder and carry the fabric 53 of the vertical rudder. A spar 54 extends rearwardly from the intersecting portions of the vertical and horizontal rudders and the free end of this spar is connected by means of brace wires 55 or the like to the outer ends of the rearwardly extending ribs of the two rudders. The spars 22 and 23 are so arranged relative to the rudders that said rudders are free to swing upon the universal joint to any desired extent without being interfered with by the spars.

Extending forwardly from two of the ribs of the upper sustaining plane are supporting spars 56 inclined upwardly toward their free ends. A frame 57 is slidably mounted on these spars and also on guide strips 58 secured on the upper sustaining plane, said frame carrying at its front end, a transverse truss 59 whereby it is reinforced. A spring controlled roller 60 similar in construction to an ordinary shade roller, is journaled between the back ends of the spars 56 and a fabric 61 is normally wound thereon, this fabric being connected at one end to the forward end of the frame 57. It is to be understood that the fabric 61 is normally wound upon the roller 60 but, whenever desired, the frame 57 can be drawn forwardly along the spars 56 and the guides 58 so as to unwind the fabric and form an emergency plane which is extended in front of the upper sustaining plane.

The means for controlling the planes and rudders have been illustrated in detail in Figs. 12 and 13. This controlling mechanism includes a shaft 62 provided at its upper end with a wheel 63 while its lower end is connected to a cord 121 extending forwardly and wound on and secured to a small sheave 119. A larger sheave 120 rotates with sheave 119 and a cord 64 is secured thereto and extends upwardly upon suitably disposed guide sheaves and is connected to the front end portion of the frame 57. This shaft is located directly in front of the aviator's seat, shown at 65 and is journaled within a tubular shaft 66 mounted for swinging movement about an axis extending transversely of the machine, the trunnions of the tubular shaft 66 being indicated by dotted lines at 67 and being extended from a bearing sleeve 68 suitably supported. A hand wheel 69 is secured to the upper end of the shaft 66 and close to the wheel 63 and a pulley 70 is connected to shaft 66 at its lower end. Another pulley 71 is loosely mounted on the shaft 66 but is adapted to be fastened thereto by means of a cam 72 whenever it is desired to rotate the pulley by means of the shaft 66. Arms 73 extend oppositely from shaft 62 close to the end of shaft 66 and openings 74 are formed within the shaft 66 at diametrically opposed points and register with arcuate slots 75 formed within the bearing sleeve 68. Cords 76 extend through the slots 75 and the openings 74 and upwardly within the shaft 66 to openings 77. The cords extend from these last mentioned openings to levers 78 and 79.
These levers are pivotally connected to the upper portion of shaft 66, as indicated at 80 and are mounted within arcuate guides 81 extending downwardly from the wheel 69. It will be noted that the cords 76 are arranged in pairs. One cord of each pair extends to the sparking mechanism of one of the engines of the aeroplane while the other cord extends to the fuel feed mechanism of the same engine. It is designed, in the present structure, to provide two independently operating engines 82 and 83 for driving the propellers 84 and 85 respectively, suitable clutch mechanism being provided whereby either or both of the engines may be coupled to the shafts of the propellers, the clutch mechanism for this purpose being set forth in detail in my patent hereinbefore referred to. It will be apparent, from the foregoing, that by shifting one of the levers 78, the sparking mechanism of one of the engines can be set for use while, by shifting the other lever of the same pair, to wit, lever 79, the fuel can be caused to feed to the engine.
Cords 86 extend forward from the free ends of arms 73 and extend partly around suitably arranged guide sheaves and are attached to the inner edges of the ailerons 44. The arms 45 are connected by a cord 100 so that, when the segment is turned in either direction, the ailerons 44 will be simultaneously shifted either to the right or the left, one of them being projected beyond one end of the upper sustaining plane 6 while the other one of the ailerons will be retracted under the other end of the sustaining plane.

The pulley 70 has cords 87 secured to it and wrapped therearound, these cords extending rearwardly past suitably arranged guide sheaves to the sides of the horizontal rudder so that, when shaft 66 is rotated by means of its wheel 69, said horizontal rudder will be shifted so as to correspondingly move the vertical rudder and thus steer the machine laterally while in flight.

The pulley 71 has a cord 88 secured to it and wrapped therearound, this cord extending past suitably arranged guide sheaves to the pulley 36 hereinbefore referred to so that, when pulley 71 is locked to shaft 66 by means of cam 72, said shaft can be rotated so as to turn the stems 30 and wheel 34 and thus guide the machine while it is being propelled along the ground.
The horizontal rudder is adapted to be shifted either automatically or manually. The means employed for shifting it manually include a lever 89 mounted adjacent the avaitor's seat and connected, by cords 90 to an upstanding arm 91 which is fulcrumed within a suitable structure between the spars 22 and 23 and pivotally connected to a rod 92 extending to the lower rear portion of the vertical rudder. The cords 90 pull in opposite directions upon the arm 91 so that, when lever 89 is swung in one direction, said arm will be shifted therewith and will pull on the rod 92 and thus tilt the horizontal rudder whereas, when the movement of the lever is reversed the movement of arm 91 and of the rudder is likewise reversed. Arm 91 has a pendulum 93 extending downwardly therefrom and integral therewith, the same including a weight 94 sufficient to swing arm 91 when the machine pitches downwardly either at its front or at its rear end so as to thus automatically shift the horizontal rudder and cause it to restore the longitudinal balance of the machine.
When the aviator is depending upon the pendulum for operating the horizontal rudder, he unlocks the lever 89 from the segment 95 provided therefor so that said lever can shift freely with the pendulum. The pendulum is held against lateral swinging movement in any desired manner as by means of the cross bar 96 to which it is attached.

As hereinbefore stated, the ailerons may be shifted by rotating the shaft 62 and thus operating the arms 73. It is desirable, however, to also provide means for automatically shifting the ailerons should the lateral balance of the machine be lost. For this purpose preferably two pendulums 97 are suspended from the upper sustaining plane 6 so as to swing laterally but not forwardly or rearwardly. The pendulums are connected above their weights to the cord 86 so that, when the pendulums shift either to the right or to the left, the ailerons will be actuated thereby and the arms 73 will also be shifted, thus rotating shaft 62 and wheel 63.

It is to be understood that the ailerons are held in their normal positions preferably by the described mechanism controlled by the pendulums 97 or by the aviator.

By pivotally mounting the bearing sleeve 68, as indicated at 67, it will be apparent that, should the machine pitch downwardly and forwardly the weight of the aviator will be thrown against the wheel 69 and the controlling shafts will thus be swung forwardly and shaft 62 will pull backwardly on the cord 64, thus shifting the frame 57 forwardly along spars 56 and extending the emergency plane 61. This plane will thus operate to displace an increased amount of air and will be of considerable assistance to the aviator in righting the machine after it has pitched forward to an undesirable extent.

It has been found that, in constructing the standards, posts, bars and spars of the machine, it is advisable to make them of tubes of light metal preferably elliptical or oval in cross sectional contour, as indicated in Fig. 8, the long axis being extended in the direction of flight while the standard or post is braced transversely by means of a web 101 of wood or other suitable light material preferably I-shaped in cross section. Where splices are necessary the ends of the frame members are beveled and a transverse groove 102 is formed in one of the beveled faces while a transverse rib 103 is formed in the other beveled face and is adapted to fit within the groove. A sleeve 104 is then placed around the lapping ends of the frame members and the sleeve and ends are held together by means of rivets 105 or the like extending transversely through them. The various guy or brace wires are preferably provided with turn buckles, such as indicated at 106 and, in addition thereto, each of said wires has a spring 107 connected thereto whereby the wire can yield to a limited extent when subjected to a sudden strain, this yielding preventing the wire from breaking. The yielding action of the spring is preferably limited by flexible strips 99 extended through and secured to the ends of the spring. Where the wires are extended through portions of the frame, they may be mounted within a tube such as indicted at 108 in Fig. 11, the wires being secured within the tube by soft solder which will break should the strain upon the wires become excessive.

In order that the propellers 84 and 85 may be coupled to or uncoupled from the engine shaft, foot levers 109 are arranged close to and below the aviator's seat so that either of them can be shifted for the purpose of operating the clutches indicated generally at 110.

What is claimed is:—

1. An aeroplane including a sustaining plane, an emergency plane normally rolled and supported in front of the sustaining plane, and means operated by the involuntary forward pitching of the aviator for shifting the emergency plane forwardly and upwardly relative to the sustaining plane.

2. An aeroplane including a sustaining plane, a normally rolled emergency plane, ailerons movably connected to the sides of the sustaining plane, means under the control of the aviator for shifting the ailerons relative to the sustaining plane, and means operated by said first mentioned means when shifted in one direction by the involuntary forward pitching of the aviator for moving the emergency plane forwardly and upwardly from the sustaining plane.

3. An aeroplane including a sustaining plane, an emergency plane normally retracted in front of the sustaining plane, means connected to the sides of the sustaining plane for restoring the lateral balance of the machine, means under the control of the aviator for actuating said balancing means, said means being movable forwardly by the involuntary forward pitching of the aviator, and means operated by the forward movement of said first mentioned means for shifting the emergency plane forwardly and upwardly relative to the sustaining plane.

4. An aeroplane including a sustaining plane, a rearwardly extending frame detachably connected thereto, combined vertical and horizontal rudders carried by said frame, wheels supporting the frame and the sustaining plane, means under the control of the aviator for shifting the rudders, means for shifting the frame supporting wheels about upwardly extending axes to steer the machine upon the ground, and means for coupling said wheel shifting means to rudder shifting means.

5. An aeroplane including upper and lower sustaining planes, standards pivotally connected to the upper plane, slotted members upon the lower plane, means upon the lower ends of the standards and mounted to swing into the slots, crossed braces connected to the lower portions of the standards to hold said means within the slots, and coöperating means upon the standards and planes for holding said standards against swinging movement relative to the planes.

6. An aeroplane including upper and lower sustaining planes, standards pivotally connected to the upper sustaining plane, slotted means upon the lower sustaining plane, coöperating means upon the standards for holding said standards against swinging movement in one direction relative to the planes, projecting devices upon the lower ends of the standards for swinging into the slots and braces connected to the lower portions of the standards, for holding said projecting devices in the slots.

7. An aeroplane including a sustaining plane, lapping supplemental planes at each end of the sustaining plane and movable about axes extending parallel with the line of flight, an operating plane extending downwardly from and fixed relative to one of the supplemental planes at each end of the sustaining plane, and connections between the supplemental planes at each end of the sustaining plane for causing the said supplemental planes to move in unison into or out of alinement with the sustaining plane.

8. A flying machine including a sustaining plane, an emergency plane normally housed adjacent the front edge of the sustaining plane, a structure fixed relative to the sustaining plane and inclined forwardly and upwardly therefrom, and means adapted to be operated by the involuntary forward pitching of the aviator, for shifting the emergency plane along said structure into position to elevate the front end of the machine.

9. An aeroplane including upper and lower sustaining planes, standards pivotally connected to one of the planes and detachably connected to the other plane, braces connecting the upper and lower portions of the standards to hold the standards in engagement with the plane to which it is detachably connected, and coöperating means upon the standards and planes for holding the braces against swinging movement relative to the planes.

In testimony that I claim the foregoing as my own, I have hereto affixed my signature in the presence of two witnesses.

EDWARD J. ELSAS.

Witnesses:
R. L. SNIDER,
ORVILLE CAMPBELL.